(12) United States Patent
Kuang (10) Patent No.: US 11,439,488 B2
(45) Date of Patent: Sep. 13, 2022

(54) BRUSHHEAD FOR POWER TOOTHBRUSH (71) Applicant: Juan-Yun Kuang, Shenzhen (CN)

(72) Inventor: Juan-Yun Kuang, Shenzhen (CN)

( * ) Notice: Subject to any disclaimer, the term of this patent is extended or adjusted under 35 U.S.C. 154(b) by 0 days.

(21) Appl. No.: 17/396,176

(22) Filed: Aug. 6, 2021

(65) Prior Publication Data
US 2022/0039929 A1   Feb. 10, 2022

(30) Foreign Application Priority Data

Aug. 7, 2020 (CN) .......................... 202021631331.2
Apr. 16, 2021 (CN) .......................... 202120794448.0

(51) Int. Cl.
*A61C 17/22* (2006.01)
*A61C 17/34* (2006.01)
*A46B 17/04* (2006.01)

(52) U.S. Cl.
CPC ............ *A61C 17/222* (2013.01); *A46B 17/04* (2013.01); *A61C 17/3481* (2013.01)

(58) Field of Classification Search
CPC ......... A46B 5/0095; A46B 5/002; A46B 9/04; A46B 13/023; A61C 17/222; A61C 17/3481
See application file for complete search history.

(56) References Cited

U.S. PATENT DOCUMENTS

| 3,256,031 A | 6/1966 | Fillweber |
| 3,851,984 A | 12/1974 | Crippa |
| 9,204,948 B2 | 12/2015 | Kloster |
| 9,724,180 B1 * | 8/2017 | Liu ....................... A61C 17/222 |
| 10,912,377 B1 | 2/2021 | Kuang |
| 11,071,613 B1 | 7/2021 | Zhou |

(Continued)

FOREIGN PATENT DOCUMENTS

| CN | 1882291 A | 12/2006 |
| CN | 101902986 A | 12/2010 |

(Continued)

OTHER PUBLICATIONS

Non-Final Rejection dated Oct. 4, 2021 for U.S. Appl. No. 17/363,382 which is the parent application of the instant application.

(Continued)

*Primary Examiner* — Shay Karls
(74) *Attorney, Agent, or Firm* — ScienBiziP, P.C.

(57) ABSTRACT

The present disclosure provides a brushhead for a power toothbrush, and the power toothbrush. The brushhead configured for an electric toothbrush, the brushhead being detachably installed on a handle of the electric toothbrush, the brushhead comprising: a brushhead element; and an engaging assembly arranged in the brushhead element and connecting the brushhead element with a driving shaft, wherein the engaging assembly comprises a main body, an accommodating cavity is defined in a first end of the main body along a first direction, the accommodating cavity is configured to accommodate the driving shaft, a material of the brushhead element is different from a material of the main body, and the first direction is a direction from an end of the brushhead element connected with the handle toward an end of the brushhead element away from the handle.

10 Claims, 10 Drawing Sheets

(56) References Cited

U.S. PATENT DOCUMENTS

| | | |
|---|---|---|
| 11,096,768 B1 | 8/2021 | Lin |
| 2001/0014990 A1 | 8/2001 | Fritsch et al. |
| 2004/0010872 A1 | 1/2004 | Chiang |
| 2005/0108838 A1 | 5/2005 | Schaefer et al. |
| 2010/0043156 A1 | 2/2010 | Kressner |
| 2010/0251493 A1 | 10/2010 | Sale et al. |
| 2010/0273126 A1 | 10/2010 | Janssen et al. |
| 2011/0107536 A1 | 5/2011 | Dabrowski et al. |
| 2014/0150190 A1* | 6/2014 | Fattori ............... A61C 17/3481 15/22.1 |
| 2014/0341636 A1 | 11/2014 | Fattori |
| 2015/0082560 A1 | 3/2015 | Graeve |
| 2015/0209125 A1 | 7/2015 | Fattori |
| 2021/0100346 A1 | 4/2021 | Dishon |
| 2021/0289930 A1 | 9/2021 | Wagner |

FOREIGN PATENT DOCUMENTS

| | | |
|---|---|---|
| CN | 103269654 A | 8/2013 |
| CN | 108087438 A | 5/2018 |
| CN | 110025390 A | 7/2019 |
| CN | 113081355 A | 7/2021 |
| DE | 102006060134 A1 | 6/2008 |
| FR | 2476994 A1 | 9/1981 |
| JP | 53-21650 B | 2/1978 |
| JP | H06-084928 U | 12/1994 |
| JP | 2001-524331 A | 12/2001 |
| JP | 2011-506025 A | 3/2011 |
| JP | 2015-160127 A | 9/2015 |
| WO | 2009/094820 A1 | 8/2009 |
| WO | 2010/001197 A1 | 1/2010 |
| WO | 2019072994 A1 | 4/2019 |
| WO | 2021110464 A1 | 6/2021 |

OTHER PUBLICATIONS

International Search Report dated Nov. 12, 2021 for International Application No. PCT/CN2021/111352 which is the family application of the instant application.

Final Rejection dated Jan. 26, 2022 for U.S. Appl. No. 17/363,382 which is the parent application of the instant application.

Non-Final Rejection dated Dec. 24, 2021 for U.S. Appl. No. 17/396,146 which is the parent application of the instant application.

* cited by examiner

BRUSHHEAD FOR POWER TOOTHBRUSH

RELATED APPLICATIONS

This application claims the benefit of priority to Chinese Patent Application Number 202021631331.2 filed on Aug. 7, 2020 and Chinese Patent Application Number 202120794448.0 filed on Apr. 16, 2021, in the China National Intellectual Property Administration. The entire contents of the above-identified application are hereby incorporated by reference.

TECHNICAL FIELD

The disclosure relates to the technical field of power toothbrush, and particularly relates to a brushhead for a power toothbrush.

BACKGROUND

With the improvement of living standards, people are paying more and more attention to dental health, and the application of power toothbrushes is becoming more and more extensive.

At present, commercially available power toothbrushes usually fall into two categories: one is a power toothbrush that drives brush bristles to rotate and vibrate by a motor, and the other is an ultrasonic power toothbrush that causes high-frequency vibration of a brushhead. The power toothbrushes in both of the above mentioned two categories usually drive the brush bristles to vibrate to achieve teeth cleaning. The brushhead and a brush handle of the power toothbrush are generally designed to be detachable, so that the brushhead can be easily replaced. A driving rod of the brush handle is connected with the brushhead, and transmits energy to vibrate the brushhead. Since vibrations are generated between the brush handle and the brushhead, the connection between the brush handle a the brushhead needs to be secured so that the brushhead and the brush handle will not separate during the vibrations.

In order to meet the above described requirements, prior arts provide a common mechanism of fixedly connecting the brush handle with the brushhead, that is, a driving shaft of the brush handle is fixedly connected with the brushhead through a coupling component. An elastic member is arranged on the coupling component to provide an elastic force to abut against the driving shaft, so that the driving shaft is fixedly connected with the brushhead. However, in such a mechanism, the elastic member is additionally arranged, which may result in a complex structure, and higher manufacturing cost.

BRIEF DESCRIPTION OF DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different Figures to indicate corresponding, or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the Figures of the accompanying drawings in which like references indicate similar elements. It should be noted that references to "an" or "one" embodiment in this disclosure are not necessarily to the same embodiment, and such references may mean "at least one".

Figure 1:
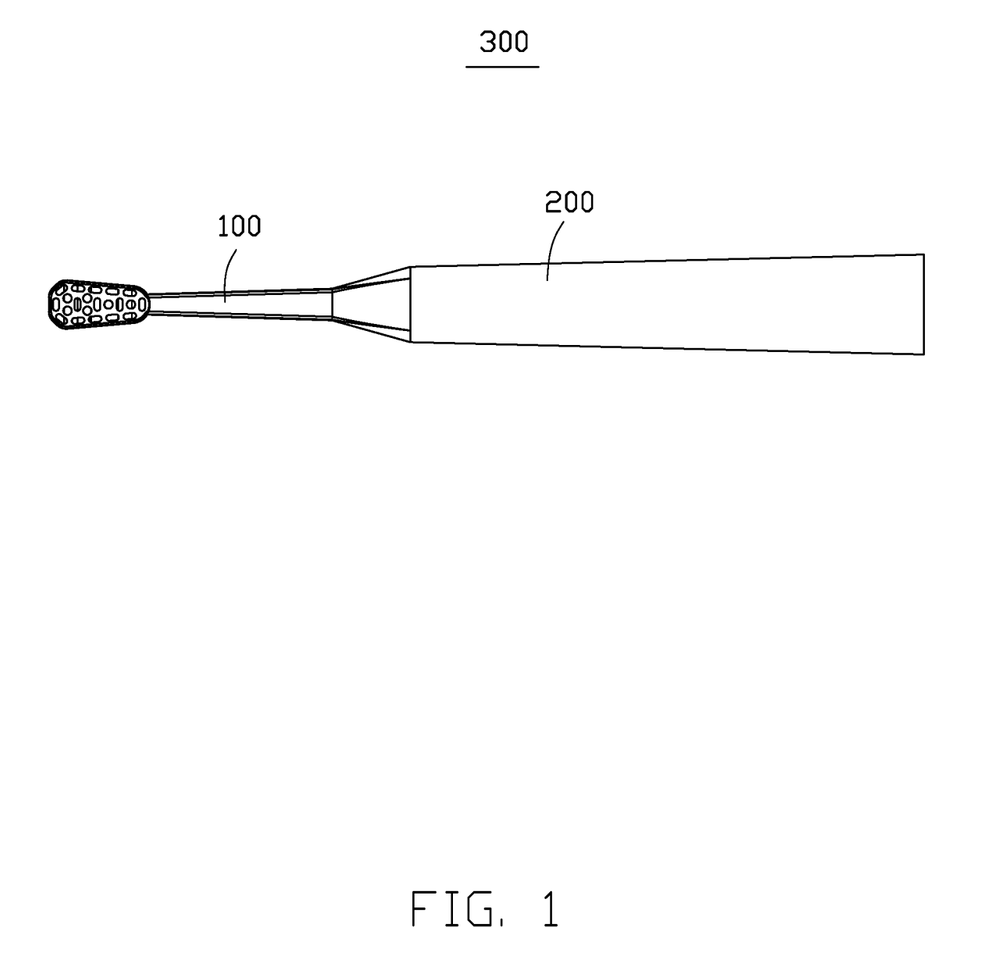
FIG. 1 is a three-dimensional structural diagram showing a power toothbrush of the present disclosure.
Figure 2:
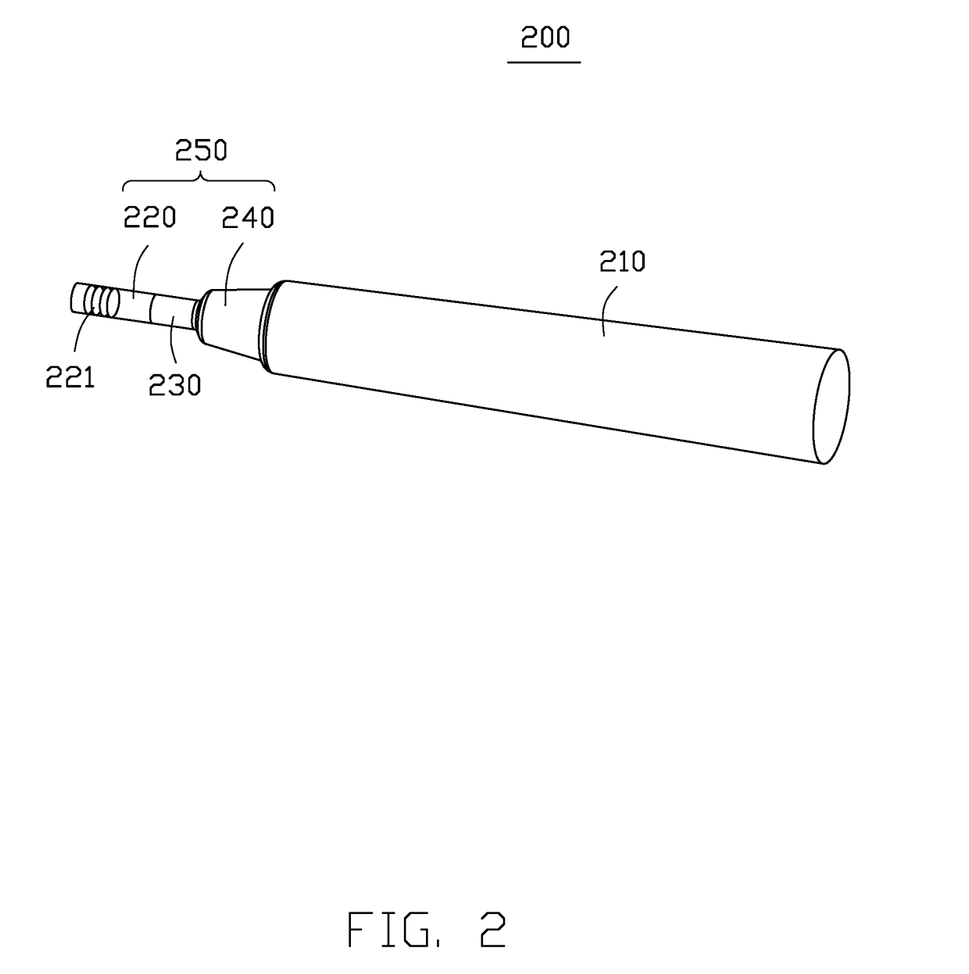
FIG. 2 is an exploded view of the power toothbrush shown in FIG. 1.

Referring to FIG. 1 and FIG. 2, a power toothbrush 300 comprises a handle 200 and a brushhead 100. The brushhead 100 is detachably attached to the handle 200 of the power toothbrush 300. The handle 200 comprises a housing 210 and a driving shaft 250 extending out of the handle 200. A motor (not shown), a control board (not shown), and a battery (not shown) are received in the housing 210, with one end of the driving shaft 250 connected to the motor. At least part of the driving shaft is inserted into the brushhead 100 when the brushhead 100 attached to the handle 200. The driving shaft 250 comprises a first metal portion 220, a second metal portion 230 and a fixing portion 240. The first metal portion 220 and the fixing portion 240 are respectively located at both ends of the second metal portion 230. The first metal portion 220, the second metal portion 230 and the fixing portion 240 are inserted into the brushhead 100.

First Embodiment

Figure 3:
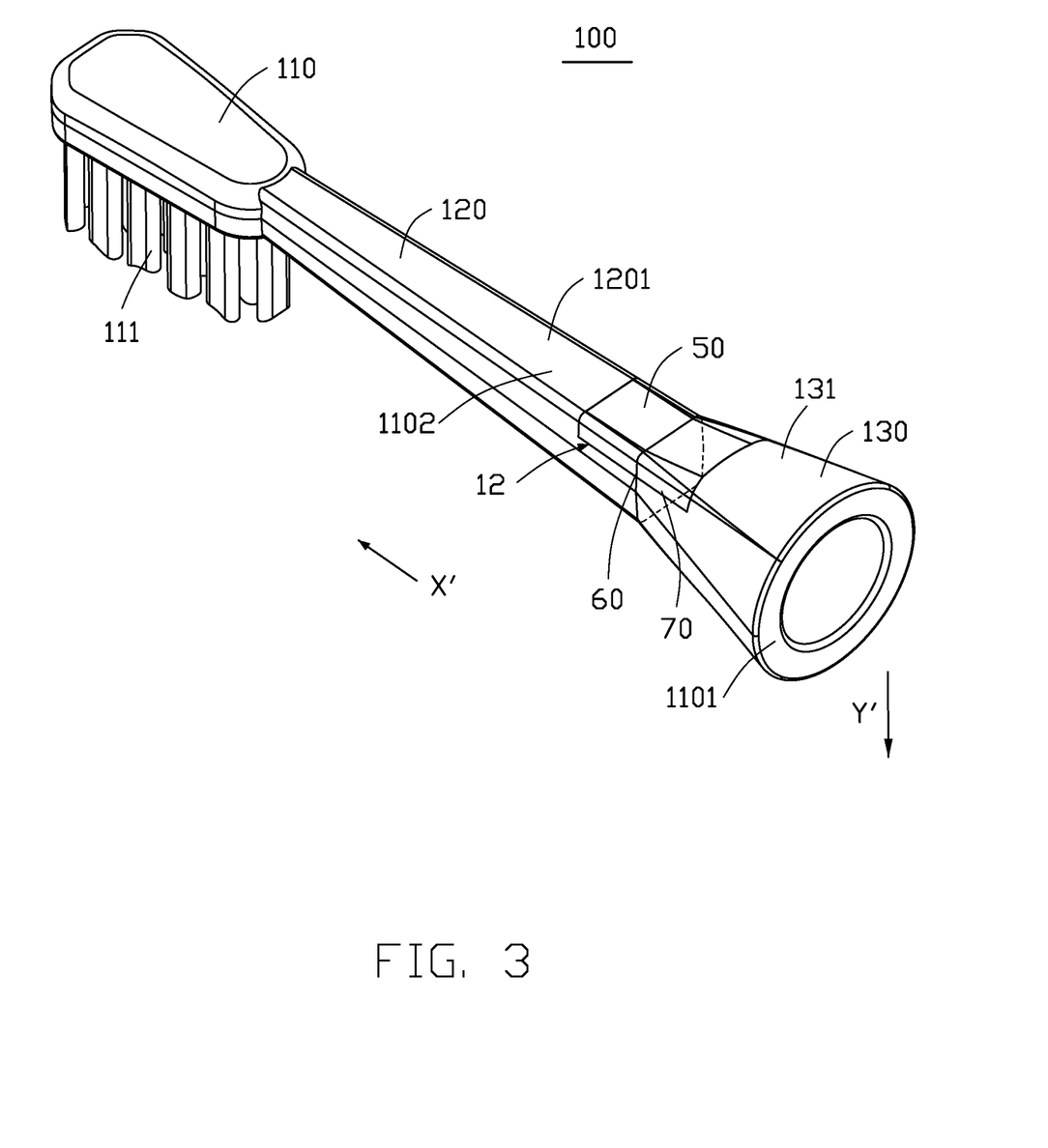
FIG. 3 is a three-dimensional structural diagram showing a brushhead of a power toothbrush according to a first embodiment of the present disclosure.

In this embodiment, the brushhead 100 for the power toothbrush comprises a brushhead element 10 and an engaging assembly 20, and the engaging assembly 20 is arranged in the brushhead element 10.

Referring to FIG. 3, the brushhead element 10 comprises a brush hair carrier 110, a neck portion 120 and an insertion portion 130, wherein the brush hair carrier 110 and the insertion portion 130 are respectively located at both ends of the neck portion 120. The brush hair carrier 110 is provided with a plurality of brush hair bundles 111 for cleaning the oral cavity. Iii this embodiment, the brush hair carrier 110 can be any well-known structure, and thus will not be repeated here.

In this embodiment, the neck portion 120 is an elongated rod-shaped structure, which is approximately cuboid, and the insertion portion 130 is approximately in a topless cone shape. In other embodiments, the neck portion 120 can also be substantially cylindrical, and the insertion portion 130 can also have other shapes, which is not specifically limited in the present disclosure.

In this embodiment, the brushhead element 10 comprises a bottom surface 1101 and a side surface 1102, and the side surface 1102 is arranged around the bottom surface 1101, an accommodating portion 12 is formed on the side face 1102 of the brushhead element 10. In particular, the neck portion 120 comprises a first out surface 1201, the insertion portion 130 comprises a second out surface 131, an accommodating portion 12 is formed at the joint between the first out surface 1201 and the second out surface 131, and the accommodating portion 12 is symmetrical relative to a plane 70 where a connecting line 60 between the neck portion 120 and the insertion portion 130 is located. The first out surface 1201 and second out surface 131 form the side surface 1201.

In this embodiment, the brushhead element 10 is selected one from a material group consisting of ABS, PP and POM.

In other embodiments, the brushhead element 10 can also be made of other materials, which is not specifically limited in the present disclosure.

Figure 4:
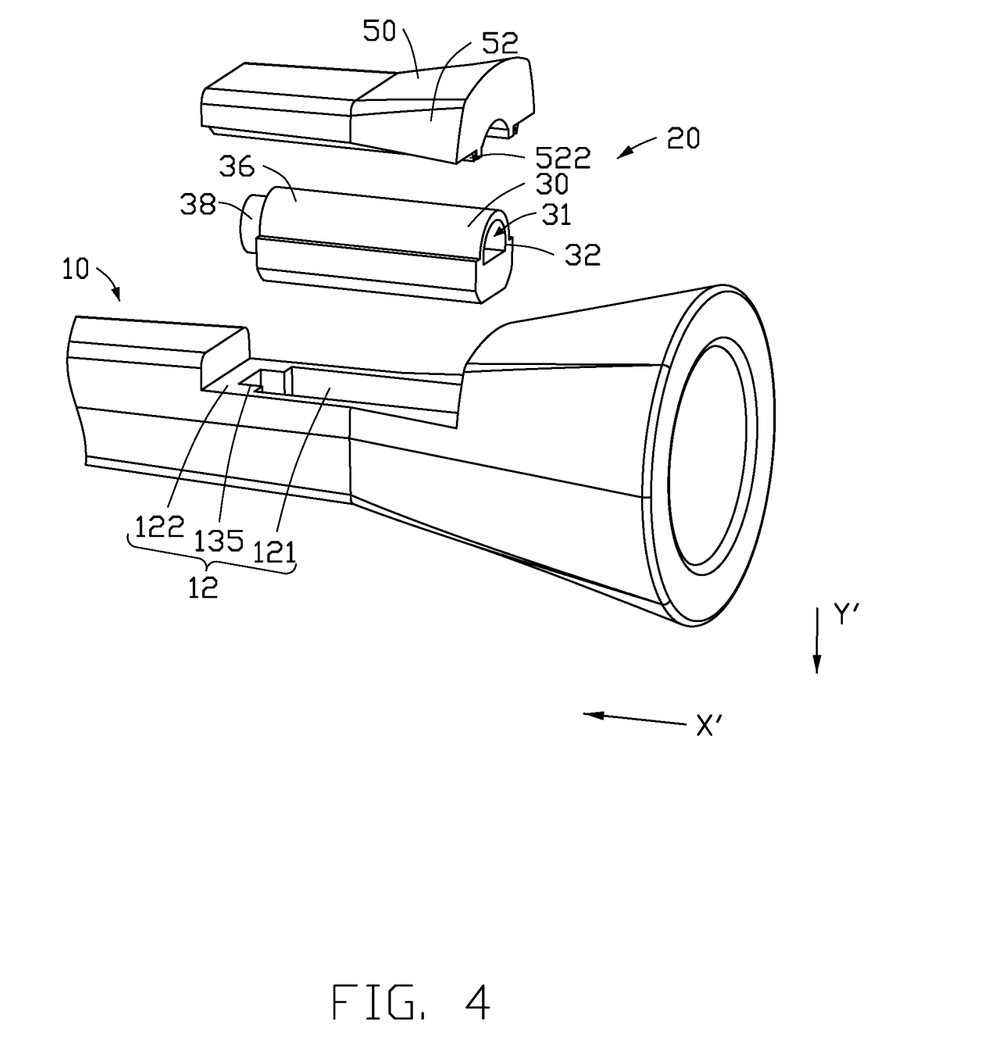
FIG. 4 is an exploded view of the brushhead shown in FIG. 3.
Figure 5:
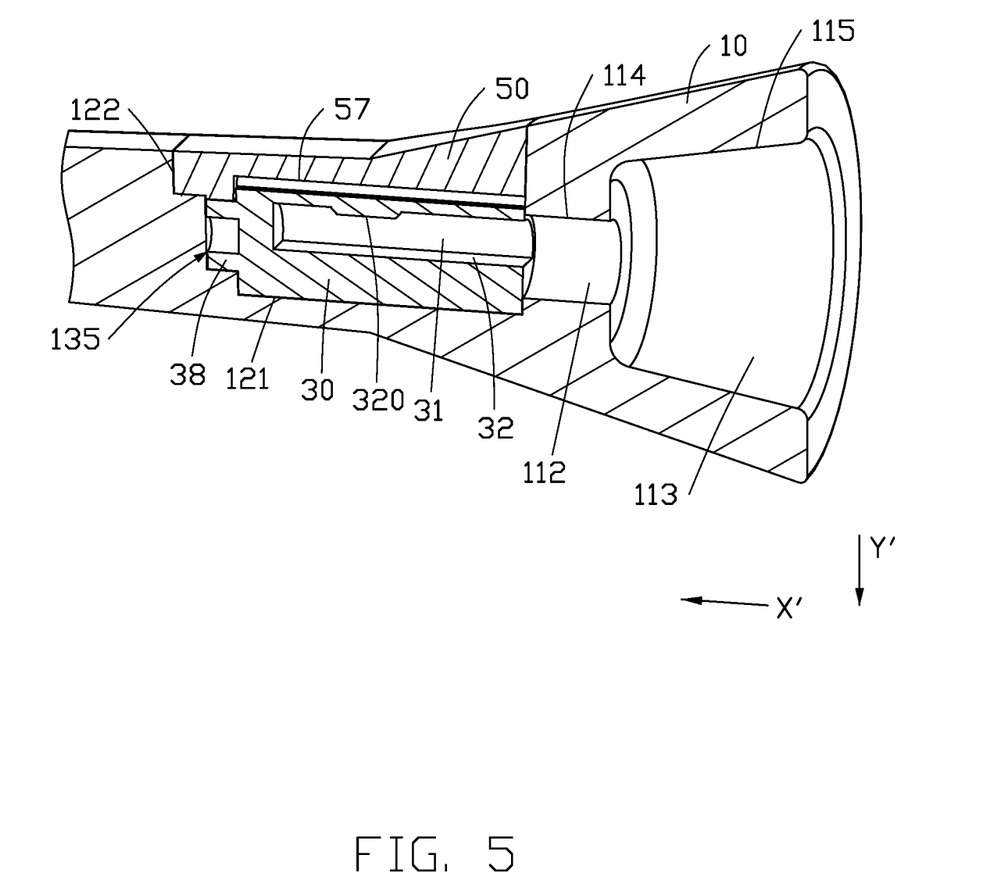
FIG. 5 is a cross-sectional view of the brushhead shown in FIG. 3 along a first direction X'.

Referring to FIG. 4 through FIG. 5, the brushhead element 10 is provided with an accommodating portion 12, the accommodating portion 12 is used for accommodating the engaging assembly 20. Further, the housing part 12 is a recess. The engaging assembly 20 is used for connecting the brushhead element 10 with the driving shaft 250, the engaging assembly 20 comprises a main body 30, one end of the main body 30 close to the handle 200, that is, the first end, is provided with a receiving cavity 31 along a first direction X', the receiving cavity 31 is used for accommodating at least a part of the driving shaft 250, the main body 30 comprises a cavity wall 32 forming the receiving cavity 31, the cavity wall 32 is convexly provided with an abutting portion 320, the abutting portion 320 is used for abutting against the driving shaft 250, and the abutting portion 320 is a rigid structure having low elasticity.

The wear resistance of the main body 30 is higher than a wear resistance of the brushhead element 10. In this embodiment, the material of the brushhead element 10 is different from the material of the main body 30 of the engaging assembly 20, the wear resistance of the material of the main body 30 is higher than the wear resistance of the material of the brushhead element 10, so that the brushhead element 10 without an elastic member separated from the brushhead element 10 and abutted against the drive shaft 250, and the first direction X' is a direction from an end of the brushhead element 10 connected to the handle 200 toward an end of the brushhead element 10 away from the handle 200.

In this embodiment, when the brushhead 100 for the power toothbrush is in an assembled state, the abutting portion 320 abuts against a first metal portion 220 of the driving shaft 250, further, the first metal portion 220 is provided with a pattern 221, and the abutting portion 320 abuts against the pattern 221 to connect the driving shaft 250 with the brushhead 100 for the power toothbrush. It can be understood that the abutting portion 320 is convexly arranged on the cavity wall 32 of the engaging assembly 20 to abut against at least a part of the driving shaft 250, when the driving shaft 250 of the handle 200 is inserted into the receiving cavity 31, the driving shaft 250 can be firmly clamped in the receiving cavity 31 and is not easy to fall off, as a result, the driving shaft 250 and the abutting portion 320 are attached more closely, and then the vibration effect of brushhead 100 for the power toothbrush is better.

In addition, the brushhead 100 for the power toothbrush of the present disclosure directly abuts against the driving shaft 250 through the abutting portion 320 arranged on the cavity wall 32 without needing an additional elastic member or other structures. In this way, the stability of the power toothbrush 300 in use can be effectively ensured, and the appearance effect is good. The structure is simple, and no additional elastic member or other structures are needed, so that the manufacturing procedures can be effectively simplified, and the production cost can be reduced.

It can be understood that a shape of the receiving cavity 31 matches a shape of the first metal portion 220 of the driving shaft 250. In this embodiment, the first metal portion 220 is substantially flat, and the receiving cavity 31 is arched.

It can be understood that the receiving cavity 31 matches the shape of the first metal portion 220 of the driving shaft 250. Since the front end portion of the driving shaft 250, that is, the first metal portion 220 is substantially flat, when the driving shaft 250 is inserted into the receiving cavity 31, on one hand, the driving shaft 250 can be prevented from rotating in the circumferential direction, on the other hand, the abutting portion 320 on the cavity wall 32 abuts against the driving shaft 250, therefore the driving shaft 250 can be further firmly clamped in the receiving cavity 31, and then the driving shaft 250 can be effectively prevented from rotating in the circumferential direction and the axial direction.

The material of the main body 30 is a material with high wear resistance, such as polyoxymethylene resin (POM), polyamide 6 (P6), polyamide 66 (P66), or polycarbonate (PC). In other embodiments, other materials can also be selected.

It can be understood that since the main body 30 is made of the above material with high wear resistance, the service life of the brushhead 100 for the power toothbrush can be effectively prolonged. Further, the abutting portion 320 made of the above material directly abuts against the driving shaft 250, so that the driving shaft 250 can be firmly clamped in the receiving cavity 31 and is not easy to fall off.

In this embodiment, the accommodating portion 12 is on a side face of the brushhead element 10. Further, the accommodating portion 12 is formed at the joint between the neck portion 12 and the insertion portion 13. Of course, in other embodiments, the forming position of the accommodating portion 12 is not particularly limited, as long as the abutting portion 320 can abut against the first metal portion 220 of the driving shaft 250.

The accommodating portion 12 comprises a first containing cavity 121 and a notch 122, and the first containing cavity 121 and the notch 122 communicate with each other to form the accommodating portion 12 with a stepped cross section, wherein the first containing cavity 121 is used for accommodating the main body 30.

The engaging assembly 20 further comprises a cover 50, and the cover 50 is arranged on the main body 30 and is fixedly arranged in the notch 122 to fix the main body 30 in the first containing cavity 121.

Further, the accommodating portion 12 is further provided with a storage portion 135, the storage portion 135 is formed on one end of the first containing cavity 121 away from the handle 200, the end of the main body 30 away from the handle 200, that is, the second end, is provided with a positioning portion 38 along the first direction X' in an extension manner, and the positioning portion 38 is accommodated in the accommodating portion 135 to prevent the main body 30 from offsetting in the first containing cavity 121, so as to ensure the stability of the brushhead 100 for the power toothbrush.

In this embodiment, a material of the cover 50 is the same as the material of the brushhead element 10.

It can be understood that the main body 30 is clamped in the accommodating portion 12 through the cover 50, and the material of the cover 50 is the same as the material of the brushhead element 10. In this way, on one hand, the driving shaft 250 can be firmly clamped in the receiving cavity 31 through the main body 30, and on the other hand, since the material of the material of the cover 50 is the same as the material of the brushhead element 10 it can be ensured that the appearance of the brushhead element 10 is not affected.

The cover 50 is fixedly connected with the brushhead element 10 by a buckle structure or ultrasonic welding. Of course, in other embodiments, the cover 50 can also be fixed in the accommodating portion 12 in other ways, which is not limited here.

In this embodiment, the cover 50 is fixedly connected with the brushhead element 10 by ultrasonic welding.

Figure 6:
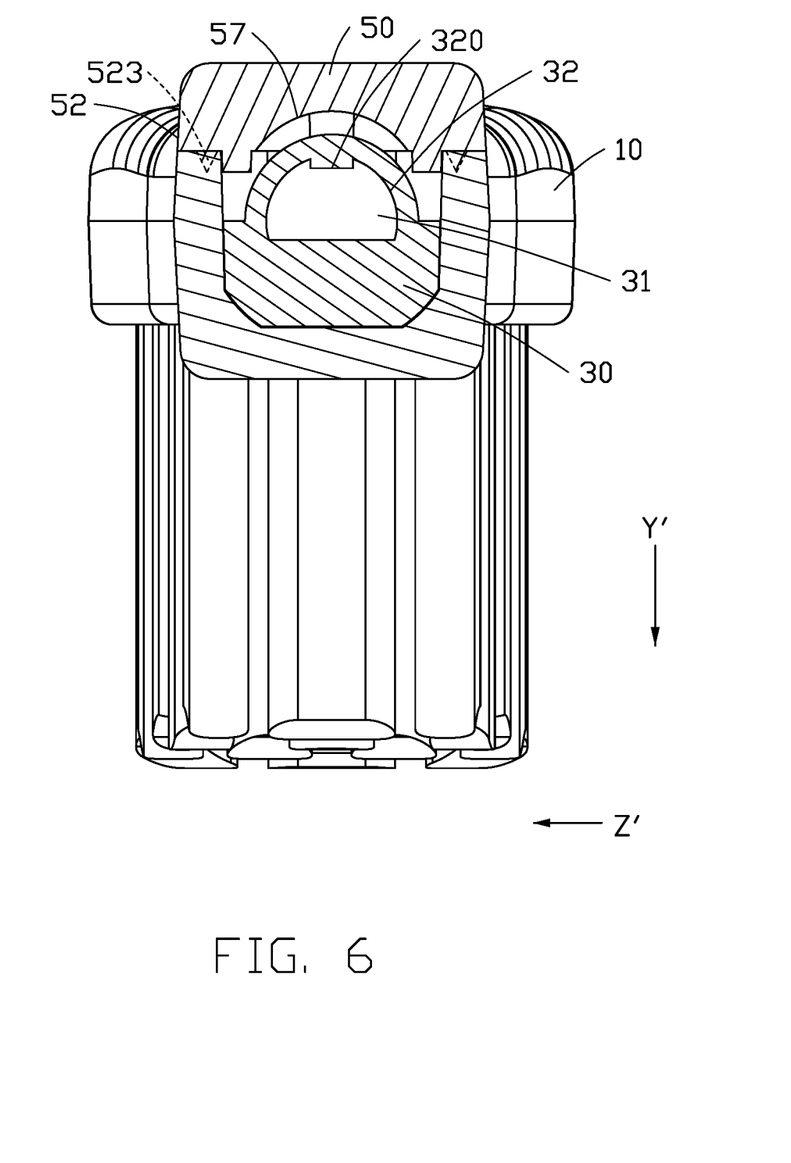
FIG. 6 is a cross-sectional view of the brushhead shown in FIG. 3 along a second direction V.

The cover 50 comprises two opposite first side walls 52, before the cover is fixed in the accommodating portion 12 by ultrasonic welding, a connecting portion 522 is arranged at one end of each first side wall 52 away from the outer surface, and the thickness of the connecting portion 522 is thinner than other areas (as shown in FIG. 4). In this way, an ultrasonic line (not shown) is formed between the connecting portion 522 and other areas; and after the cover 50 is fixed in the accommodating portion 12 by ultrasonic welding, the connecting portion 522 is welded with a part of the brushhead element 100 to form a connecting area 523 (as shown in FIG. 6), so that the cover 50 is fixedly connected with the brushhead element 100.

It can be understood that by arranging the connecting portion 522 with the smaller thickness on the first side wall 52 of the cover 50, the connecting portion 522 is easier to perform welding action and provides a sufficient space for welding with at least a part of the brushhead element 100. In addition, the cover 50 is fixed in the accommodating portion 12 by ultrasonic welding, so that the structure is simple, and the connection is more stable.

Of course, in other embodiments, the cover 50 can also be fixed to a notch 122 through a buckle structure, which is not limited here.

In addition, in this embodiment, the top wall 36 of the main body 30 is arc-shaped, and the shape of the bottom wall 57 of the cover 50 matches that of the top wall 36 of the main body 30 so as to be better attached to the top wall 36 of the main body 30. Of course, in other embodiments, the top wall 36 can also be planar, as long as the shape of the bottom wall 57 of the cover 50 matches that of the top wall 36 of the main body 30.

In this embodiment, the top wall 36 is a continuous wall. In this way, after the driving shaft 250 is inserted into the receiving cavity 31, the pattern 221 abuts against the abutting portion 320. Accordingly, the abutting portion 320 is only slightly deformed, and thus the driving shaft 20 is fixedly connected with the main body 30.

In other embodiments, a groove (not shown) or a through hole (not shown) can also be formed in the top wall 36, as long as the abutting portion 320 can abut against the pattern 221, and the driving shaft 20 is fixedly connected with the main body 30. It can be understood that in other embodiments, the outer surface of the cover 50 can be provided with a desired pattern, shape, color and the like according to requirements, which is not specifically limited in the present disclosure.

The brushhead element 10 is further formed with a first space-keeping cavity 112 and a second space-keeping cavity 113 along the first direction X', when the brushhead 100 for the power toothbrush is in the assembled state, the receiving cavity 31 and the second space-keeping cavity 113 are respectively located at the both ends of the first space-keeping cavity 112, and the first space-keeping cavity 112 and the second space-keeping cavity 113 respectively accommodate a second metal portion 230 and a fixing portion 240 of the handle 200.

In this embodiment, the second metal portion 230 is not in contact with the wall surface 114 of the first space-keeping cavity 112, and the fixing portion 240 is not in contact with the wall surface 115 of the second space-keeping cavity 113.

It can be understood that the second metal portion 230 is not in contact with the wall surface 114 of the first space-keeping cavity 112, and the fixing portion 240 is not in contact with the wall surface 115 of the second space-keeping cavity 113, so as to avoid affecting the driving shaft 250 from driving the brushhead 100 for the power toothbrush to vibrate.

According to this embodiment, the abutting portion 320 is convexly arranged on the cavity wall 32 of the engaging assembly 20 to abut against at least a part of the driving shaft 250, that is the pattern 221, when the driving shaft 250 of the handle 200 is inserted into the receiving cavity 31, the driving shaft 250 can be firmly clamped in the receiving cavity 31 and is not easy to fall off, as a result, the driving shaft 250 and the abutting portion 320 are attached more closely, and then the vibration effect of the brushhead 100 for the power toothbrush is better. In addition, the brushhead 100 for the power toothbrush of the present disclosure directly abuts against the driving shaft 250 through the abutting portion 320 arranged on the cavity wall 32 without needing an additional elastic member or other structures. In this way, the stability of the power toothbrush 300 in use can be effectively ensured, and the appearance effect is good. The structure is simple, and no additional elastic member or other structures are needed, so that the manufacturing procedures can be effectively simplified, and the production cost can be reduced.

Second Embodiment

Hereinafter, the second embodiment of the present disclosure will be described with reference to FIG. 7 to FIG. 10. In addition, for the convenience of description, components having the same functions as those described in the above-mentioned embodiment are marked with the same reference signs, and are not repeatedly described.

Figure 7:
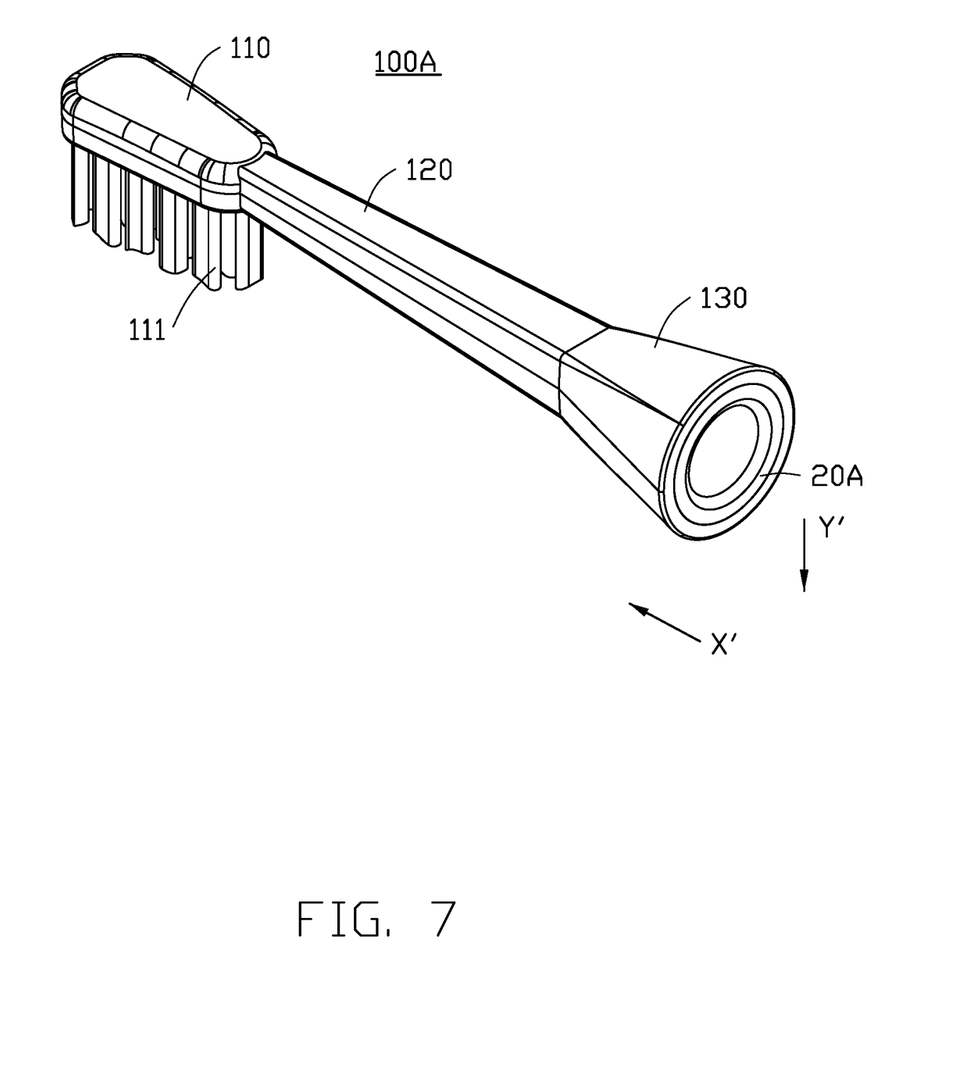
FIG. 7 is a three-dimensional structural diagram showing a brushhead of a power toothbrush according to a second embodiment of the present disclosure.

The difference between a brushhead 100A for a power toothbrush in the second embodiment and the brushhead 100 for the power toothbrush in the first embodiment lies in the difference in the arrangement position of an engaging assembly 20A.

Figure 8:
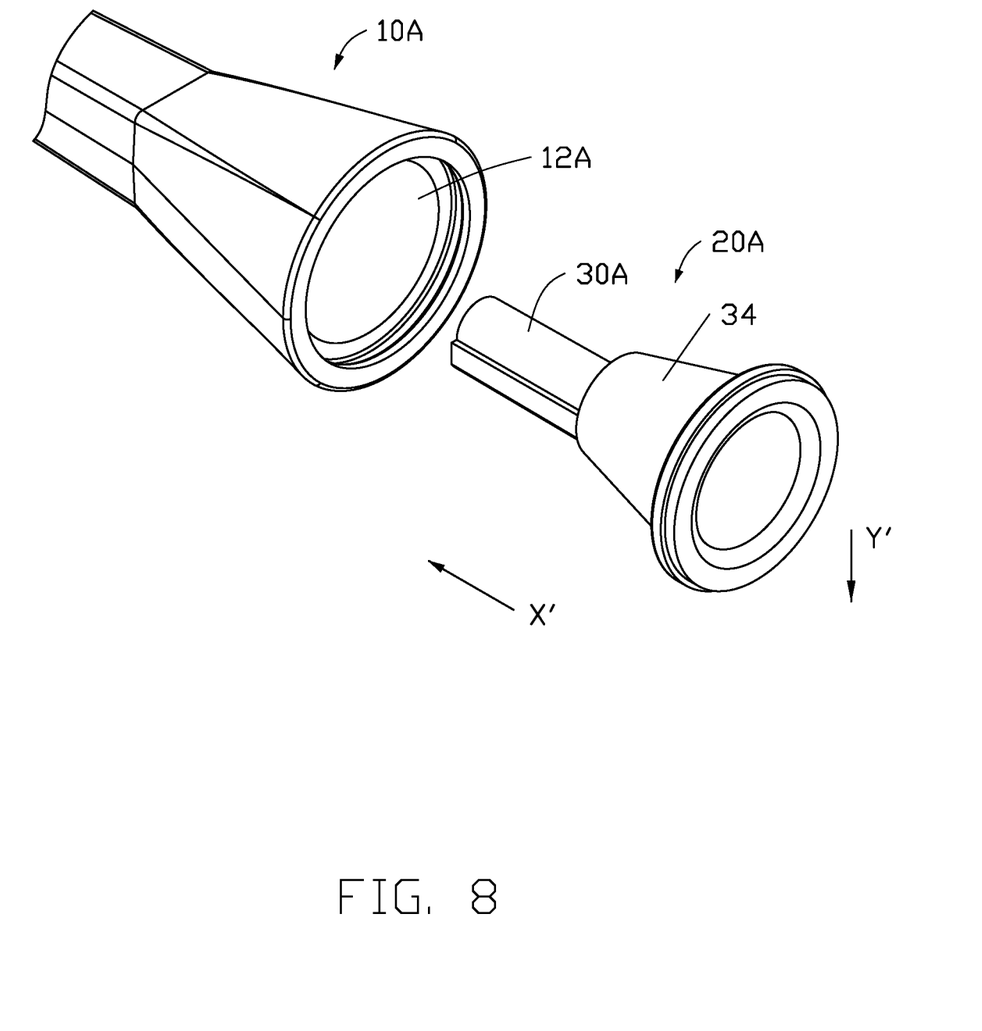
FIG. 8 is an exploded view of the brushhead shown in FIG. 7.
Figure 9:
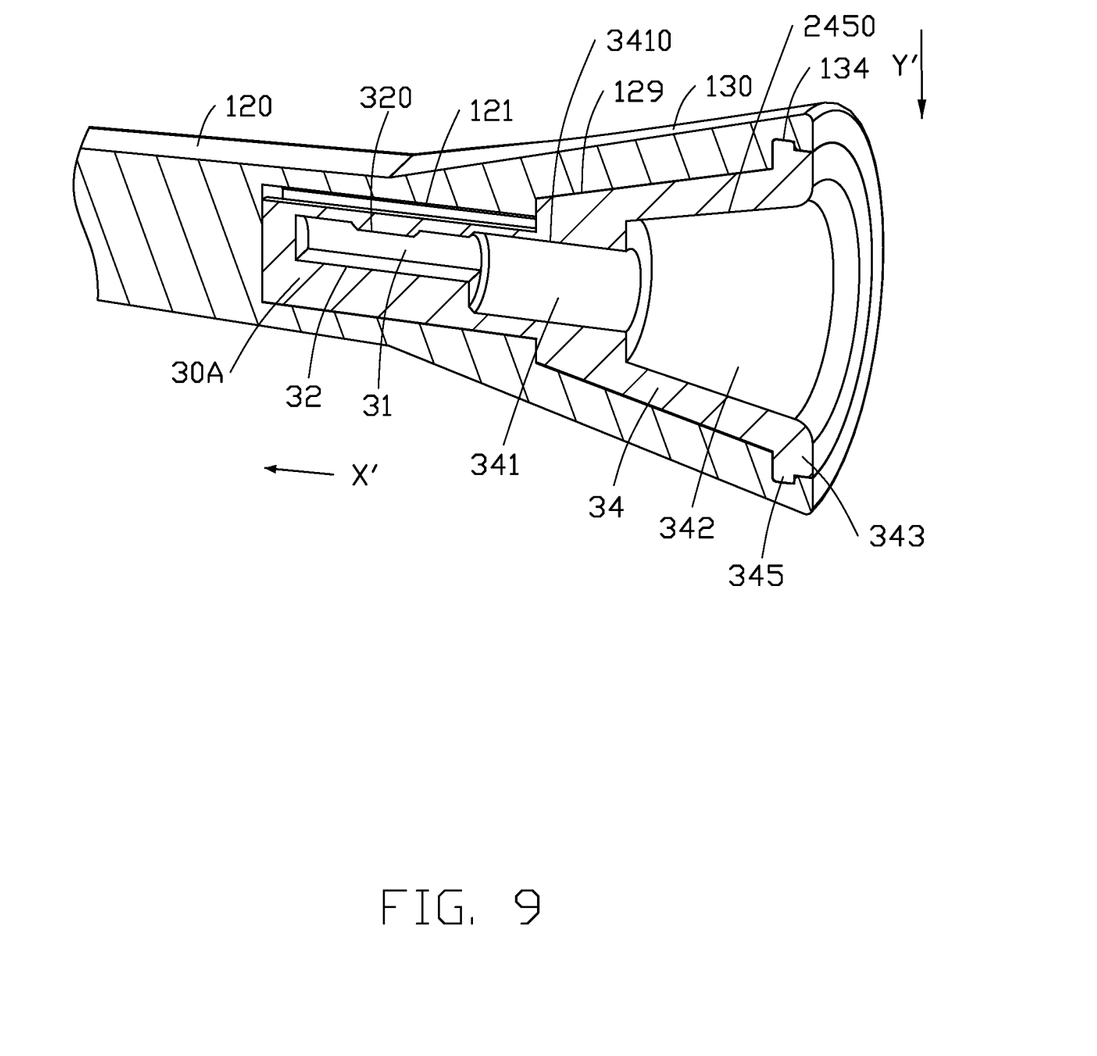
FIG. 9 is a cross-sectional view of the brushhead shown in FIG. 7 along the first direction X'.
Figure 10:
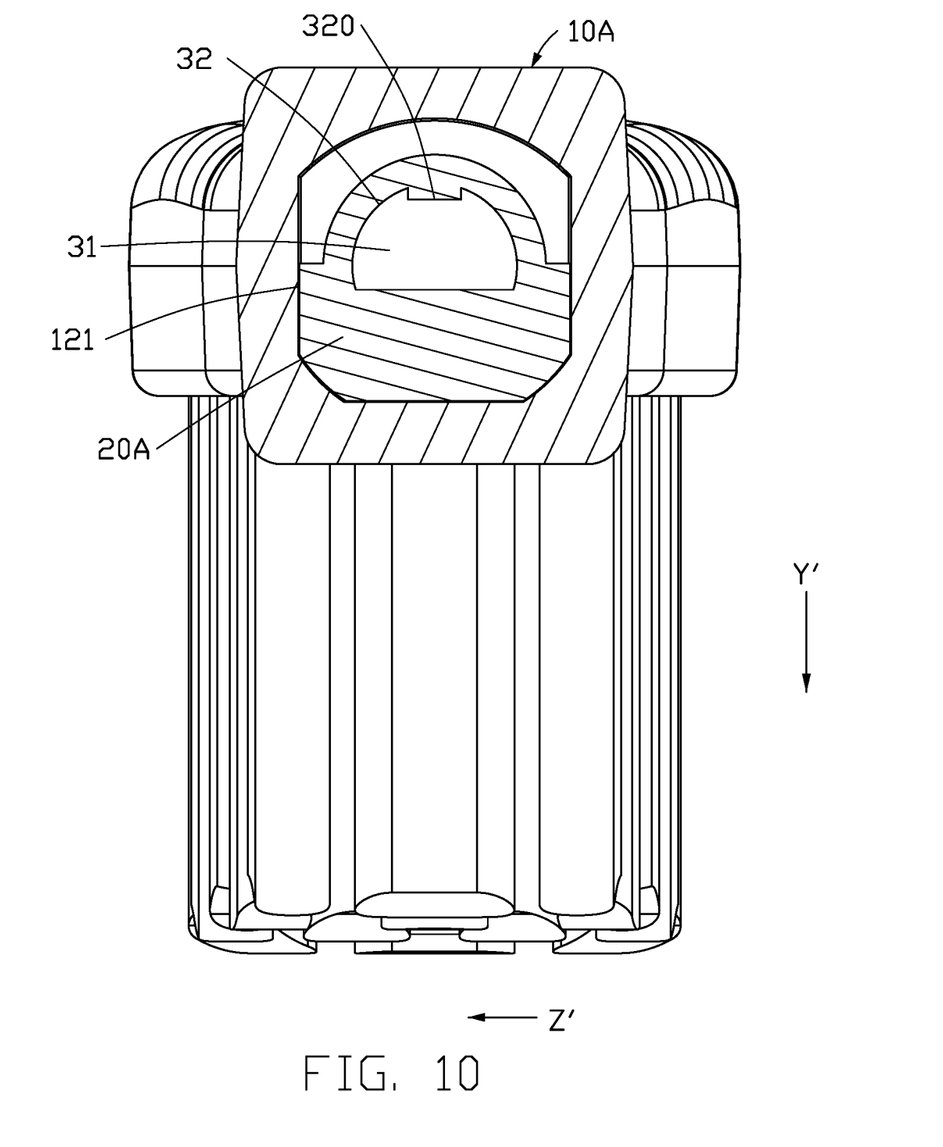
FIG. 10 is a cross-sectional view of the brushhead shown in FIG. 8 along the second direction Y'.

Referring to FIG. 7 through FIG. 9, an accommodating portion 12A is formed in a brushhead element 10A along the first direction X', and the accommodating portion 12A is used for accommodating the engaging assembly 20A. The accommodating portion 12A comprises a first containing cavity 121 and a second containing cavity 129.

The engaging assembly 20A comprises a main body 30A, the main body 30A is accommodated in the first containing cavity 121, one end of the main body 30A close to the handle 200, that is, the first end, is provided with an extension portion 34 along a direction opposite to the first direction X' in an extension manner, and the extension portion 34 is accommodated in the second containing cavity 129. In this embodiment, the extension portion 34 and the main body 30A are integrally formed.

A receiving cavity 31 is formed in the main body 30A along the first direction X', the receiving cavity 31 is used for accommodating at least a part of the driving shaft 250, a first space-keeping, cavity 341 and a second space-keeping cavity 342 are formed in the extension portion 34, when the brushhead 100A for the power toothbrush is in an assembled state, the receiving cavity 31 and the second space-keeping cavity 342 are respectively located at the both ends of the first space-keeping cavity 341, and the first space-keeping cavity 341 and the second space-keeping cavity 342 respectively accommodate the second metal portion 230 and the fixing portion 240 of the handle 200.

The second metal portion 230 is not in contact with the wall surface 3410 of the first space-keeping cavity 341, and the fixing portion 240 is not in contact with the wall surface 3420 of the second space-keeping cavity 342, so as to avoid affecting the driving shaft from driving the brushhead 100A for the power toothbrush to vibrate.

The end portion of the extension portion 34 close to the handle 200 is also provided with a boss 343 in an extension manner, a protrusion portion 345 is further arranged between the boss 343 and the extension portion 34, a groove 134 is formed in a position on the inner wall of the second containing cavity 129 corresponding to the protrusion portion 345, and in the assembled, state of the brushhead for the power toothbrush, the protrusion portion 345 is inserted into the groove 134 to fixedly arrange the main body 30A in the second containing cavity 129, so that the main body 30A is fixedly connected with the brushhead element 10A.

According to this embodiment, the abutting portion 320 is convexly arranged on the cavity wall 32 of the engaging assembly 20 to abut against at least a part of the driving shaft 250, and the wear resistance of the material of the main body 30A is higher than the wear resistance of the material of the brushhead element 10A, when the driving shaft 250 of the handle 200 is inserted into the receiving cavity 31, the driving shaft 250 can be firmly clamped in the receiving cavity 31 and is not easy to fall off, as a result, the driving shaft 250 and the abutting portion 320 are attached more closely, and then the vibration effect of brushhead 100 for the power toothbrush is better.

In addition, the brushhead 100 for the power toothbrush of the present disclosure directly abuts against at least a part of the driving shaft 250 through the abutting portion 320 arranged on the cavity wall 32, and further, the abutting portion 320 directly abuts against the pattern 221 on the first metal portion 220 of the driving shaft 250. In this way, no additional elastic member or other structures are needed, so the stability of the power toothbrush 300 in use can be ensured, and the appearance effect is good. The structure is simple, the manufacturing procedures can be effectively simplified, and the production cost can be reduced.

In addition, in this embodiment, the accommodating portion 12 is formed in the brushhead element 10A to accommodate the engaging assembly 20A, only the connection between the brushhead element 10A and the engaging assembly 20A needs to be considered during the assembly process, the falling of the brushhead 100 for the power toothbrush and the offset between the brushhead 100 for the power toothbrush and the handle 200 can be effectively prevented, thereby ensuring the stability of the power toothbrush 300 in use. Furthermore, the appearance effect is good, the structure is simple, and volume production is facilitated.

What disclosed above are only the preferred embodiments of the present application, which of course cannot be used for limiting the present application. Therefore, equivalent changes made in accordance with the present application still fall within the scope of the present application.

An embodiment of the present disclosure has the following features:

One embodiment of the present disclosure provides a brushhead for a power toothbrush. The brushhead configured for an electric toothbrush, the brushhead being detachably installed on a handle of the electric toothbrush, the brushhead comprising: a brushhead element; and an engaging assembly arranged in the brushhead element and connecting the brushhead element with the driving shaft, wherein the engaging assembly comprises a main body, an accommodating cavity is defined in a first end of the main body along a first direction, the accommodating cavity is configured to accommodate a driving shaft, a material of the brushhead element is different from a material of the main body, and the first direction is a direction from an end of the brushhead element connected with the handle toward an end of the brushhead element away from the handle.

In some embodiments, a wear resistance of the main body is higher than a wear resistance of the brushhead element, so that the brushhead element is capable of abutting against the drive shaft without using any elastic member.

In some embodiments, the main body is not provided with an elastic wall abutting against the driving shaft.

In some embodiments, the main body comprises a cavity wall forming a receiving cavity, the cavity wall is provided with an abutting portion, and the abutting portion is configured for abutting at least a portion of the driving shaft, and the abutting portion is a rigid structure having low elasticity.

In some embodiments, the main body comprises a cavity wall, the cavity wall defines a receiving cavity, the cavity wall is provided with an abutting portion, and the abutting portion is configured for abutting at least a portion of the driving shaft.

In some embodiments, the cavity wall of the main body is a continuous wall.

In some embodiments, the material of the main body is selected from a material group consisting of POM, PA6, PA66 and PC, and the material of the brushhead element is selected from a material group consisting of ABS, PP and POM.

In some embodiments, the receiving cavity accommodates a first metal portion of the driving shaft, and a shape of the receiving cavity matches a shape of the first metal portion.

In some embodiments, the abutting portion abuts against a pattern of the first metal portion.

In some embodiments, the brushhead element comprises an accommodating portion, and the accommodating portion accommodates the engaging assembly.

In some embodiments, the brushhead element comprises a bottom surface and a side surface arranged around the bottom surface, the accommodating portion is on the side surface of the brushhead element, the accommodating portion comprises a first containing cavity and a notch, the first containing cavity accommodating the main body, the engaging assembly further comprises a cover, and the cover is fixedly arranged in the notch.

In some embodiments, a material of the cover is the same as a material of the brushhead element.

In some embodiments, the brushhead element further comprises a first space-keeping cavity and a second space-keeping cavity along the first direction, when the brushhead is in an assembled state, the receiving cavity and the second space-keeping cavity are respectively located at both ends of the first space-keeping cavity, and the first space-keeping cavity and the second space-keeping cavity respectively accommodate a second metal portion and a fixing portion of the handle.

In some embodiments, wall surface of the first space-keeping cavity is not in contact with the second metal portion, and wall surface of the second space-keeping cavity is not in contact with the fixing portion.

In some embodiments, the cover is fixedly connected with the brushhead element by ultrasonic welding.

One embodiment of the present disclosure provides a power toothbrush. The comprising: a brushhead, and a handle, wherein the brushhead is detachably installed on the handle, the handle comprising a driving shaft, the brushhead comprising: a brushhead element; and an engaging assembly arranged in the brushhead element and fixedly connecting the brushhead element with the driving shaft, wherein the engaging assembly comprises a main body, an accommodating cavity is defined in a first end of the main body along a first direction, the accommodating cavity is configured to accommodate the driving shaft, a wear resistance of the main body is higher than a wear resistance of the brushhead element, and the first direction is a direction from an end of the brushhead element connected with the handle toward an end of the brushhead element away from the handle.

What is claimed is:

1. A brushhead configured for an electric toothbrush, the brushhead being detachably installed on a handle of the electric toothbrush, the brushhead comprising:
   a brushhead element; and
   an engaging assembly arranged in the brushhead element and connecting the brushhead element with a driving shaft,
   wherein the engaging assembly comprises a main body, an accommodating cavity is defined in a first end of the main body along a first direction, the accommodating cavity is configured to accommodate the driving shaft, a material of the brushhead element is different from a material of the main body, and the first direction is a direction from an end of the brushhead element connected with the handle toward an end of the brushhead element away from the handle, and
   wherein a wear resistance of the material of the main body is higher than a wear resistance of the material of the brushhead element, and the brushhead element abuts against the drive shaft without an elastic member.

2. The brushhead according to claim 1, wherein
   the main body comprises a cavity wall forming a receiving cavity, the cavity wall is provided with an abutting portion, and the abutting portion is configured for abutting at least a portion of the driving shaft, and the abutting portion is a rigid structure having low elasticity.

3. The brushhead according to claim 2, wherein the receiving cavity accommodates a first metal portion of the driving shaft, and a shape of the receiving cavity matches a shape of the first metal portion.

4. The brushhead for the power toothbrush according to claim 3, wherein the abutting portion abuts against the first metal portion.

5. The brushhead according to claim 3, wherein the brushhead element comprises an accommodating portion, and the accommodating portion accommodates the engaging assembly.

6. The brushhead according to claim 5, wherein the brushhead element comprises a bottom surface and a side surface arranged around the bottom surface, the accommodating portion is on the side surface of the brushhead element, the accommodating portion comprises a first containing cavity and a notch, the first containing cavity accommodating the main body, the engaging assembly further comprises a cover, and the cover is fixedly arranged in the notch.

7. The brushhead according to claim 6, wherein a material of the cover is the same as a material of the brushhead element.

8. The brushhead according to claim 7, wherein the brushhead element further comprises a first space-keeping cavity and a second space-keeping cavity along the first direction, when the brushhead is in an assembled state, the receiving cavity and the second space-keeping cavity are respectively located at both ends of the first space-keeping cavity, and the first space-keeping cavity and the second space-keeping cavity respectively accommodate a second metal portion and a fixing portion of the handle, the first metal portion and the fixing portion are respectively located at both ends of the second metal portion.

9. The brushhead according to claim 8, wherein a wall surface of the first space-keeping cavity is not in contact with the second metal portion, and a wall surface of the second space-keeping cavity is not in contact with the fixing portion.

10. The brushhead according to claim 6, wherein the cover is fixedly connected with the brushhead element by ultrasonic welding.

* * * * *